May 22, 1951          J. L. HILE          2,554,408
DISPLAY DEVICE WITH REMOVABLY ATTACHED INDICIA
Filed Aug. 1, 1946
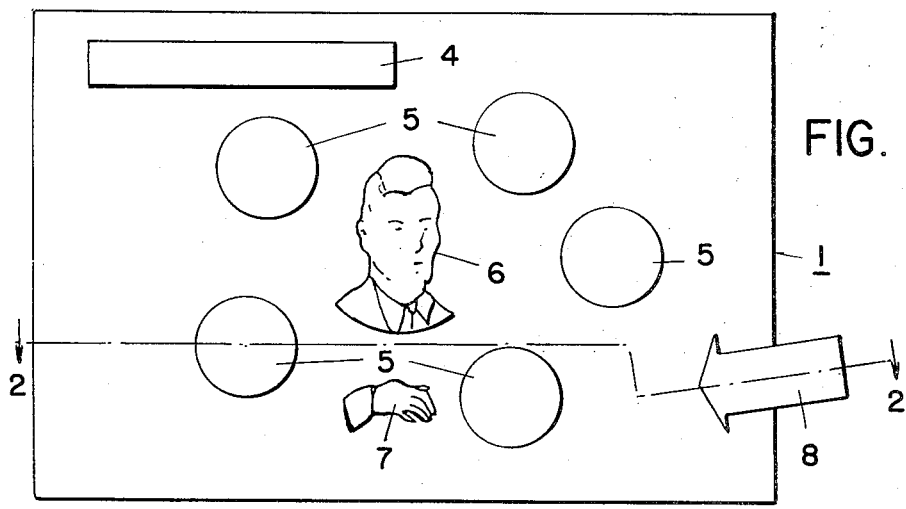
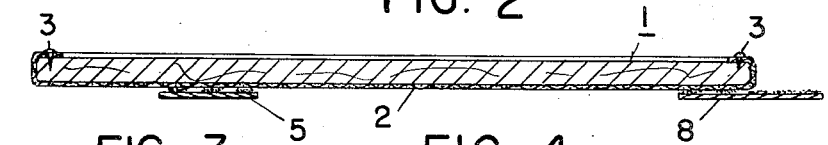
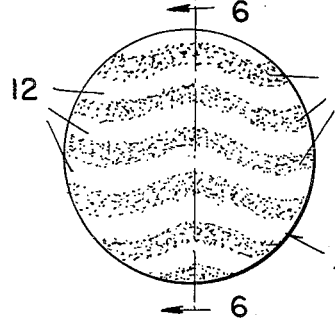
FIG. 3
FIG. 4
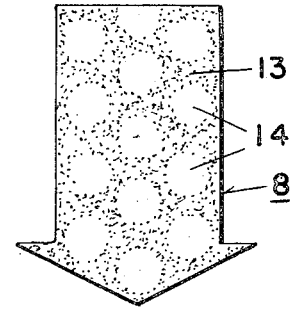
FIG. 5
FIG. 6
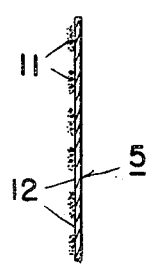
FIG. 7
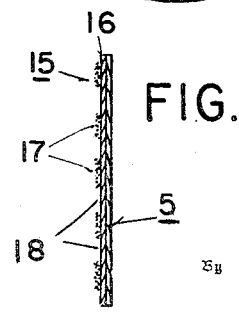
FIG. 8
Inventor
James L. Hile
Albert H. Kirchner
Attorney Patented May 22, 1951

2,554,408

UNITED STATES PATENT OFFICE 2,554,408

DISPLAY DEVICE WITH REMOVABLY ATTACHED INDICIA

James L. Hile, New York, N. Y., assignor to Hile-Damroth, Inc., New York, N. Y., a corporation of New York Application August 1, 1946, Serial No. 687,589

6 Claims. (Cl. 40—142)

The present invention relates to display devices and more particularly to the combination of a board and a plurality of indicia elements which can be removably attached to the board.

The combination of such a board and removable pieces is broadly quite old. The novelty of the present invention resides principally in the character of the cooperating means provided on the surface of the board and on the surface of the indicia elements by which the latter are made easily and instantly attachable to the board in any position or location and by which they can be as readily moved to other positions or locations on the board or removed therefrom.

Boards and indicia elements of the broad class to which this invention relates are useful for many purposes in connection with a wide variety of visual display work in such fields as education, business, the playing of games, the preparation of photographic or television copy, and in all sorts of graphic demonstration. Familiar examples of such uses consist in employing the combination as a bulletin board, as a child's kindergarten accessory, as a lecturer's classroom device, for the illustration of sales talks, to show graphically the situation being portrayed by the testimony of a witness in a court room, in the playing of games like checkers or chess, to make up advertising copy for photographing or other kind of duplication, and for numerous other uses which will readily occur to those skilled in the art.

The prior art abounds in sets of boards and detachable indicia elements which are attached by the interfit of tongues and grooves, or studs and sockets, but these have the disadvantage of limiting the location on the boards to which the separate pieces can be attached. In other types of structures the pieces are adhesively secured to the board, but this arrangement has the disadvantage, among others, of causing damage to the board and/or the pieces by the adhesion and of preventing or making difficult relocation or reuse of the pieces.

A disadvantage common to both of the foregoing prior art arrangements is the expense of preparing the board and the pieces.

It has been proposed heretofore to provide the detachable pieces and the board with fibrous surfaces, each characterized by a multiplicity of projecting short fibers or filaments, so that the fibers of the two surfaces will become mutually entangled when the pieces are pressed against the board. This arrangement has been moderately successful, but it has the disadvantage of making the bond between the board and the pieces insecure so that the pieces frequently become accidentally detached.

The present invention provides an improvement in the fibrous type of bond by substituting on one of the cooperating board and piece members, preferably on the detachable indicia pieces, a new type of surface which will make easily and quickly a very secure connection or bond with the fibrous surface which is provided on the other member of the combination. This new type of surface consists of a multiplicity of granules of sand, flint or other mineral or like substance. A typical example which I have found highly successful in actual practice and which I therefore at present prefer is conventional sandpaper of medium or comparatively coarse texture.

I have found that such granular surface can be pressed against the fibrous surface of the cooperating member of the combination with the result that the short projecting fibers or tentacles of the one surface become entangled with the sharp edges of the granules and in the crevices between them so that the two members are held quite securely together. I have found further that the bond thus provided is a semi-permanent one which will be maintained securely for any length of time desired, against all reasonable disturbing influences, such as rough handling, wind and the like, without in any way preventing intentional separation when desired. Such separation is easily effected by simply pulling the piece from the board, whereupon it is found that substantially all the fibers of the fibrous surface become disengaged from the granular surface without being pulled out of the fibrous surface, so that the latter is undamaged and is capable of reuse an indefinitely large number of times.

The present arrangement has the advantage of low cost, since the materials employed are exceedingly inexpensive and because they can be applied, both to the board and to the detachable pieces, easily and quickly by unskilled persons.

Assuming that the preferred arrangement is used, in which the board is faced with the fibrous material and the individual detachable pieces are backed with the granular material, the user of the apparatus can quickly prepare a series of pieces for any type of use as the need for such use arises. The pieces may be cut-outs in the form of photographs, drawings, conventional or special symbols, figures or letters, or small articles of manufacture or natural objects, such as keys, coins, insects, leaves, flowers, etc.

A preferred form of embodiment of the invention is shown in the accompanying drawing in which:

Figure 1 is a front elevational view of a board with a number of the indicia elements applied thereto;

Fig. 2 is a cross sectional view taken along the line 2—2 of Fig. 1;

Figs. 3, 4 and 5 are rear elevational views of different indicia pieces, showing three different forms of rear surfaces;

Fig. 6 is a cross sectional view through an indicia piece showing one form of rear surface; and Figs. 7 and 8 are similar views showing other forms of rear surfaces.

In the drawing, the reference numeral 1 designates generally a board made in any convenient size, of any suitable comparatively rigid sheet material, such as wood, heavy cardboard, building board or the like. This is the mounting or backing board to which the indicia elements are to be removably attached, and which may be hung on a wall, mounted on an easel, or otherwise supported where it can be plainly seen.

The front face of the board 1 is covered by a layer 2 consisting of a sheet of textile, felted or knitted fabric made of wool, hair or other fibrous material and presenting a relatively coarse surface characterized by a multiplicity of fibers projecting as short and preferably curled or twisted filaments or tentacles. This sheet is stretched sufficiently taut across the surface of the board to be wrinkle-free and may be glued, tacked or otherwise fastened in place. Its margins are preferably folded around the edges of the board and are tacked or otherwise secured in place along the rear margins of the board, as shown at 3, with or without the interposition of a narrow metal ribbon or binding strip.

A plurality of indicia elements are shown mounted in place on the board in Fig. 1 and designated by the reference numerals 4, 5, 6, 7 and 8. These are all flat sheets of any thin more or less rigid or even flexible material, such as paper or cardboard. Manifestly, they may be cut in any shape and depict any design. Elements like those designated 6 and 7 may be photographs or drawings, while those designated 4, 5 and 8 may bear written or printed indicia such as words, phrases or individual letters, numerals, symbols, etc. There is no limit to the variety of indicia which may be borne by the elements.

Each of the elements has a rear surface which is characterized by a multiplicity of granules of the type used in conventional sand or flint paper. The function of these granules, which are permanently and securely affixed to the indicia elements, is to become entangled with the projecting fibers of the sheet 2 so as securely to bond the indicia element to the sheet 2 and to the board on which the sheet is mounted.

The granules are applied in spaced areas to the backs of the indicia elements in patterns by which the granular areas are separated by intervening blank spaces which are depressed below the level of the granules in arrangements typified by those shown in Figs. 3, 4 and 5. It will be observed that these arrangements include spaced straight stripes 9 of granules in Fig. 4, separated by blank spaces 10 which are devoid of granules. In Fig. 3 the stripes 11 of granules and intervening blank spaces 12 are sinuously curved; and in Fig. 5 the granular area 13 is mutilated by a number of more or less regularly spaced openings 14. This arrangement is readily provided by simply perforating a sheet of conventional sandpaper, or a sheet made in the manner of sandpaper, by cutting openings 14 into it.

The several patterns of rear surfaces contemplated by the invention may be provided by brushing or printing wet glue areas directly on the back of an indicia element and then applying loose granules thereto. When the glue sets the granules are found permanently carried by the surface in the shapes in which the wet glue was applied. Such an arrangement is shown in Fig. 6, where 5 designates one of the indicia elements and 11 indicates the stripes of granules directly applied to the element.

In another form of embodiment, shown in Fig. 7, the indicia element 5 may have adhesively secured to its rear surface a prepared sheet 15 of special sandpaper or of material made in the manner of sandpaper, comprising a supporting sheet 16 and stripes or areas 17 of granules separated by intervening open spaces 18.

A third form of embodiment, shown in Fig. 8, is made by cutting strips of sandpaper or the like 19 and gluing or otherwise fastening such strips to the back of an indicia element 5.

It will be observed that in the illustrated embodiments of the invention granules project from localized areas on the rear surfaces of the pieces and that blank depressed spaces intervene between these granular areas. When an indicia element thus prepared is pressed against the fibrous surface 2 of the board, preferably with a slight lateral rubbing movement, the projecting fibers of the sheet 2 become entangled with the granules and firm adhesion results. The tenacity of the bond is increased by the presence of the intervening blank depressed areas such as those shown at 10, 12 and 14, probably because in these blank areas the fibers are permitted to extend and engage the sides or edges of the granular areas. I regard this as an important feature of the invention.

I regard it also important to have the edges of the board 1 covered by the margins of the sheet 2, as has been explained and as is shown in Fig. 2. This permits pieces, like the element 8 in Figs. 1 and 2, to be applied to a margin of the board and to have a portion extend off the board, beyond its edge, as is shown in Figs. 1 and 2, thus increasing the capacity of the board and in many cases adding emphasis to the function performed by the outwardly projecting element.

As herein illustrated and explained, the fibrous surface is provided on the board and the granular surface on the indicia pieces. This arrangement is preferred because it is easier to cut, manipulate and apply prepared granular sheets, e. g., pieces of ordinary sandpaper, to a plurality of indicia elements than it is to handle and apply small pieces of fibrous sheeting to them, and also because the granular sheet material is cheaper than the fibrous fabric and for that reason it is more economical to select it as the material which is to be used in greatest quantity. However, the reverse arrangement, by which the board is faced with granular sheeting and the indicia elements are backed with fibrous fabric, is entirely within the spirit and scope of the invention, and such embodiments are to be deemed within the scope and purview of the appended claims.

The particular color or design of the board is subject to wide variation and forms no part of the invention. Ordinarily the board surface will be plain and of solid color, but it may be configured with some background appropriate to the intended use to which the device is to be put. As one example, the board surface may be checkered and the indicia elements may be made in the form of checkers or chessmen. Such a combination permits the games of checkers and chess to be played by a bedridden person, or outdoors in the wind, or under other conditions where conventional checkers, chessmen or other playing pieces would become deranged on a conventional playing board. It is believed to be unnecessary to attempt to list other designs with which the board may be provided or to suggest further uses to which the combination may be put, since many of them will be self-evident from the device itself and from the foregoing explanation of its operative details.

The principles of invention are capable of being embodied in forms different from those which have been herein selected to illustrate the invention, and all such modifications, to the extent that they incorporate the principles of the invention as defined by the appended claims, are to be considered within the scope and purview thereof.

I claim:

1. In a display device, for attachment to a board having a fibrous surface, an indicia element having a rear surface characterized by a plurality of mutually separated areas each having a multiplicity of surface granules adhesively secured to the element so that the granules along the bottom edges of the areas are adapted when pressed against the fibrous surface of the board to become well entangled with the fibers thereof so as to cause the element to adhere to the board.

2. In a display device, for attachment to a board having a fibrous surface, an indicia element having a rear surface characterized by a plurality of separate stripes each having a multiplicity of surface granules adhesively secured to the element so that the granules along the bottom edges of the stripes are adapted when pressed against the fibrous surface of the board to become well entangled with the fibers thereof so as to cause the element to adhere to the board.

3. In a display device, for attachment to a board having a fibrous surface, an indicia element having a rear surface characterized by a plurality of separate curved stripes each having a multiplicity of surface granules adhesively secured to the element so that the granules along the bottom edges of the stripes are adapted when pressed against the fibrous surface of the board to become well entangled with the fibers thereof so as to cause the element to adhere to the board.

4. In a display device, for attachment to a board having a fibrous surface, an indicia element having a rear surface characterized by a plurality of areas each having a multiplicity of granules separated from a similar area by a space which is smooth and devoid of granules, the granules of said areas, and particularly the granules at the bottom edges thereof, being adapted when pressed against the fibrous surface of the board to become well entangled with the fibers thereof so as to cause the element to adhere to the board.

5. In a display device, for attachment to a board having a fibrous surface, an indicia element having a rear surface characterized by a plurality of areas each having a multiplicity of granules separated from a similar area by a space which is smooth and devoid of granules and relatively depressed, the granules of said area, and particularly the granules at the bottom edges thereof, being adapted when pressed against the fibrous surface of the board to become well entangled with the fibers thereof so as to cause the element to adhere to the board.

6. In a display device, for attachment to a board having a fibrous surface, an indicia element having sandpaper secured to its rear surface to provide by a plurality of spaced apart areas each having a multiplicity of granules separated from each next adjacent area by a smooth, depressed space and said granules, particularly those at the bottom edges of said areas, being adapted when pressed against the fibrous surface of the board to become well entangled with the fibers thereof so as to cause the element to adhere to the board.

JAMES L. HILE.

REFERENCES CITED

The following references are of record in the file of this patent:

UNITED STATES PATENTS

| Number | Name | Date |
| --- | --- | --- |
| 1,803,256 | Horn | Apr. 28, 1931 |

FOREIGN PATENTS

| Number | Country | Date |
| --- | --- | --- |
| 668,348 | France | July 9, 1929 |